US008638525B1

(12) United States Patent
Sugii (10) Patent No.: US 8,638,525 B1
(45) Date of Patent: Jan. 28, 2014

(54) PARTICLE-CAPTURING DEVICE CONFIGURED TO REMOVE PARTICLES FROM A PLURALITY OF AIR-STREAMS FLOWING WITHIN A DISK ENCLOSURE OF A HARD-DISK DRIVE

(75) Inventor: Taisuke Sugii, Ibaraki (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/557,159

(22) Filed: Jul. 24, 2012

(51) Int. Cl.
*G11B 33/14* (2006.01)
(52) U.S. Cl.
USPC ..................................... 360/97.17; 360/97.15
(58) Field of Classification Search
USPC ....................... 360/97.11–97.18; 720/648–651
See application file for complete search history.

(56) References Cited

U.S. PATENT DOCUMENTS

| 5,995,323 | A | 11/1999 | Jinbo et al. | |
|---|---|---|---|---|
| 6,097,569 | A | 8/2000 | Haruyama | |
| 7,318,859 | B2 * | 1/2008 | Ball et al. | 360/97.16 |
| 7,394,615 | B2 | 7/2008 | Abe et al. | |
| 2005/0195523 | A1 | 9/2005 | Abe et al. | |
| 2006/0221536 | A1 | 10/2006 | Goto | |
| 2007/0025015 | A1 * | 2/2007 | Suwa et al. | 360/97.02 |
| 2008/0068746 | A1 * | 3/2008 | Kaneko et al. | 360/97.03 |
| 2008/0112074 | A1 * | 5/2008 | Yao et al. | 360/97.02 |
| 2009/0002880 | A1 * | 1/2009 | Ueda et al. | 360/97.02 |
| 2009/0091857 | A1 * | 4/2009 | Chan et al. | 360/97.02 |
| 2010/0246059 | A1 | 9/2010 | Shimizu | |

OTHER PUBLICATIONS

Smarthdd, "Hard Disk Drive Air Filter", http://www.smarthdd.com/en/filters.htm, Oct. 19, 2011.
Spears, Shally, "Hard Disk Air Filter Failure and Recovery", http://www.articlesbase.com/data-recovery-articles/hard-disk-air-filter-failure-and-recovery-893455.html, Apr. 29, 2009.

\* cited by examiner

*Primary Examiner* — Nathan Danielsen (57) ABSTRACT

A particle-capturing device configured to remove particles from a plurality of air-streams flowing within a disk enclosure of a HDD. The particle-capturing device includes a particle-capturing filter, and a filter holder. The filter has a front side and a back side. The filter holder holds the filter. The filter holder has a first opening configured to allow a first in-bound air-stream to flow in-bound through a first portion of the filter, which is disposed in the first opening, from the front side out through the back side of the filter, and a second opening configured to allow an out-bound air-stream to flow out-bound through a second portion of the filter, which is disposed in the second opening, from the back side out through the front side of the filter. A HDD and a particle-capturing system that include the particle-capturing device are also provided.

21 Claims, 10 Drawing Sheets

PARTICLE-CAPTURING DEVICE CONFIGURED TO REMOVE PARTICLES FROM A PLURALITY OF AIR-STREAMS FLOWING WITHIN A DISK ENCLOSURE OF A HARD-DISK DRIVE

TECHNICAL FIELD

Embodiments of the present invention relate generally to the field of hard-disk drives (HDDs), and in particular to particle-capturing devices to remove particles from a plurality of air-streams flowing within a disk enclosure of a HDD.

BACKGROUND

With the advance of HDD technology, the spacing between a magnetic-recording head and a magnetic-recording disk has become progressively smaller, on the order of a few nanometers (nm). Consequently, small disturbances in air-flow that can give rise to air-flow turbulence that can affect the head-to-disk spacing, or fly-height, have become of greater concern. In addition, particles carried in the air-stream can give rise to head-disk interference (HDI) events that can affect the fly-height, and may even give rise to errors in the recording, or retrieval, of information stored on the magnetic-recording disk. Thus, engineers and scientists engaged in the development of HDDs are becoming increasingly more interested in providing an HDD environment of high reliability for the storage of information, and HDD designs at reduced costs.

SUMMARY

Embodiments of the present invention include a particle-capturing device configured to remove particles from a plurality of air-streams flowing within a disk enclosure of a hard-disk drive (HDD). The particle-capturing device includes a particle-capturing filter, and a filter holder. The filter has a front side and a back side. The filter holder holds the filter. The filter holder has a first opening configured to allow a first in-bound air-stream to flow in-bound through a first portion of the filter, which is disposed in the first opening, from the front side out through the back side of the filter, and a second opening configured to allow an out-bound air-stream to flow out-bound through a second portion of the filter, which is disposed in the second opening, from the back side out through the front side of the filter. Further embodiments of the present invention include a HDD that includes the particle-capturing device, and a particle-capturing system that includes the particle-capturing device.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Also, elements of pluralities of similar elements may be referred to with the reference numeral of a represent element of the plurality of similar elements.

Figure 1:
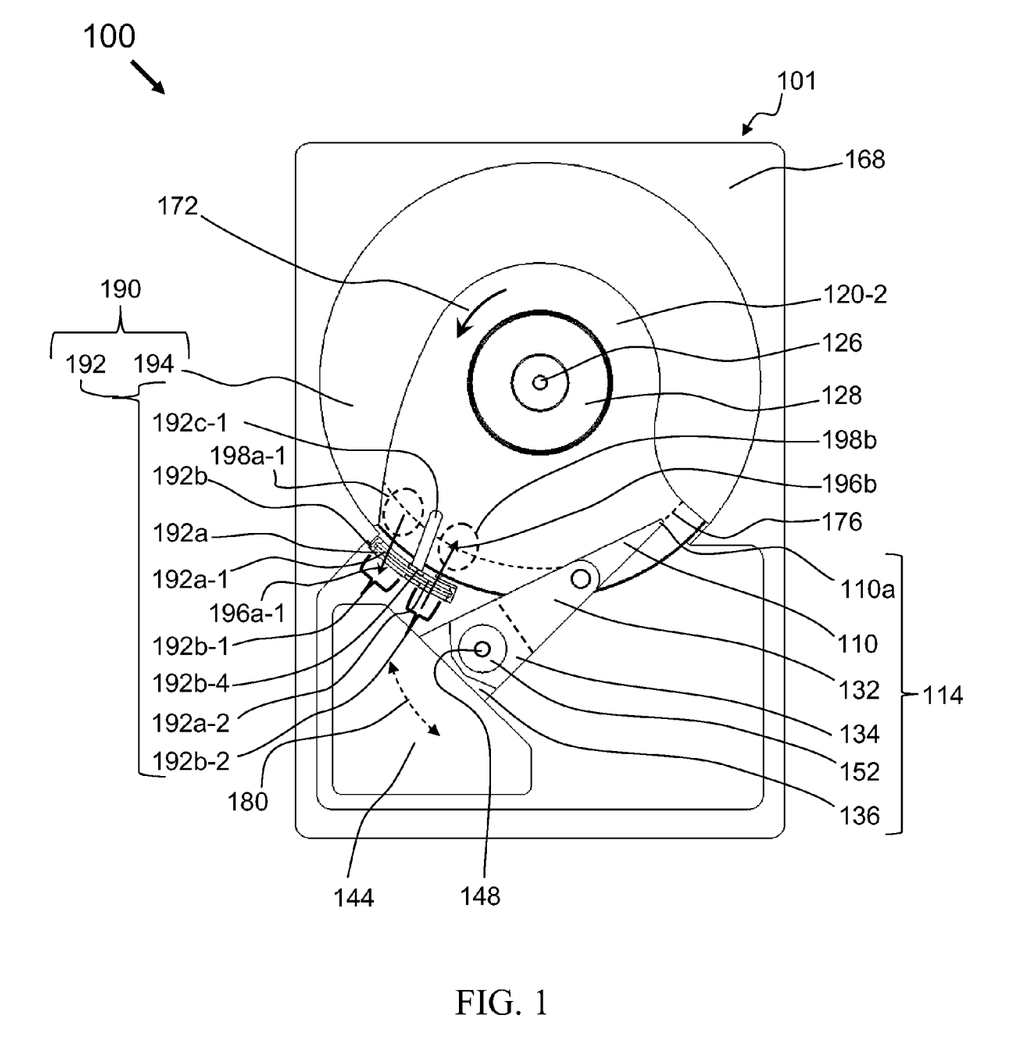
FIG. 1 is a plan view showing the arrangement of components within the environment of a hard-disk drive (HDD) that includes a first example of a particle-capturing device, and a particle-capturing system including the particle-capturing device, configured to remove particles from a plurality of air-streams flowing within a disk enclosure of the HDD, in accordance with embodiments of the present invention.

Physical Description of Embodiments of a Particle-Capturing Device Configured to Remove Particles from a Plurality of Air-Streams Flowing within a Disk Enclosure of a Hard-Disk Drive With reference now to FIG. 1, in accordance with embodiments of the present invention, a plan view 100 of a hard-disk drive (HDD) 101 is shown. As shown in FIGS. 1-7 and 9-10, HDD 101 is shown with a disk-enclosure cover, and a top most magnetic-recording disk 120-1 (see FIG. 8) removed for ease of description of various embodiments of the present invention. By way of example embodiments of the present invention are described herein with respect to the magnetic-recording disk 120-2 shown in FIGS. 1-10; however, embodiments of the present invention may also apply to other magnetic-recording disks in HDD 101 without limitation to magnetic-recording disk 120-2. FIG. 1 illustrates the arrangement of components within HDD 101 that includes a first example of a particle-capturing device 192, and a particle-capturing system 190 that includes the particle-capturing device 192 and a damper plate 194. The particle-capturing device 192 and the particle-capturing system 190 are configured to remove particles from a plurality of air-streams, for example, in-bound air-stream 196a-1 and out-bound air-stream 196b, without limitation thereto, flowing within a disk enclosure of HDD 101. Throughout the following description, embodiments of the present invention described for the particle capturing device 192 may be incorporated within the particle-capturing system 190. Similarly, throughout the following description, embodiments of the present invention described for the particle capturing device 192 and the particle-capturing system 190 may be incorporated within the environment of HDD 101.

Figure 2:
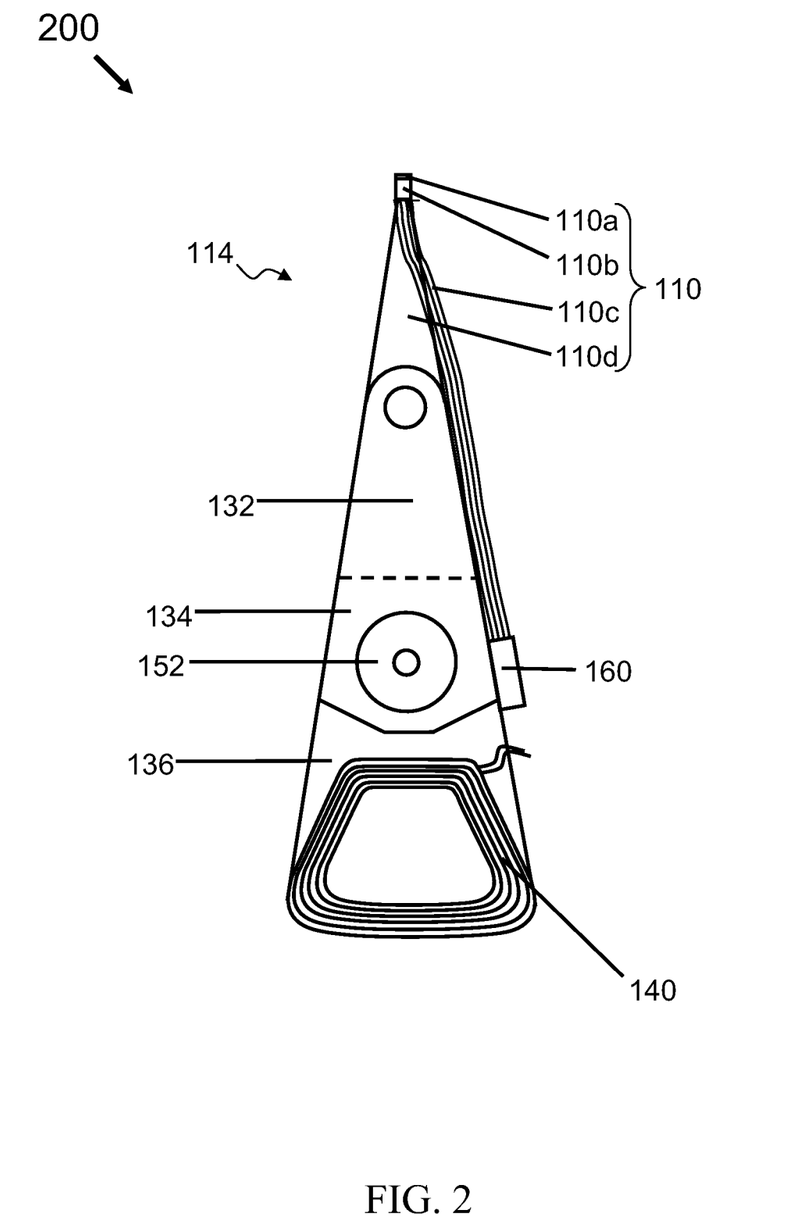
FIG. 2 is a plan view showing details of a head-arm assembly (HAA) utilized within the HDD of FIG. 1, in accordance with an embodiment of the present invention.

With reference now to FIG. 2 and further reference to FIG. 1, HDD 101 also includes at least one head-gimbal assembly (HGA) 110, which is shown in the plan view 200 of FIG. 2 in greater detail as part of a head-arm assembly (HAA) 114. The HGA 110 includes a magnetic-recording head 110a, a slider 110b to which the magnetic-recording head 110a is coupled at a distal end of the slider 110b, a lead-suspension 110c attached to the magnetic-recording head 110a, and a load beam 110d attached to the slider 110b. The slider 110b is attached at the distal end of the load beam 110d by means of a gimbal portion of the load beam 110d. HDD 101 also includes at least one magnetic-recording disk 120-2 rotatably mounted on a spindle 126 and a spindle motor (SPM) (not shown) mounted in a disk-enclosure base 168 and attached to the spindle 126 for rotating the magnetic-recording disk 120-2. The magnetic-recording disk 120-2, or a plurality (see FIG. 3) of magnetic-recording disks, may be affixed to the spindle 126 with a disk clamp 128. The magnetic-recording head 110a that includes a write element, referred to by the term of art, "writer," and a read element, referred to by the term of art, "reader," is disposed for respectively writing and reading information, referred to by the term of art, "data," stored on the magnetic-recording disk 120-2 of HDD 101.

Also, other terms of art may be used herein to describe the orientation of components in HDD 101. By way of example, the slider 110b includes six sides: a side facing an inside diameter (ID) of the magnetic-recording disk 120-2, referred to herein as an ID side; a side facing an outside diameter (OD) of the magnetic-recording disk, an OD side; a side at a leading edge (LE) of the slider 110b facing into a direction 172 of rotation of the magnetic-recording disk, a LE side; a side at a trailing edge (TE) of the slider 110b facing away from the direction 172 of rotation of the magnetic-recording disk, a TE side; a side facing the gimbal attachment at the end of the load beam 110d, a gimbal-facing side; and, a side facing the magnetic-recording disk, a disk-facing side. Similarly, the terms of art, inside-diameter (ID), outside-diameter (OD), leading-edge (LE), trailing-edge (TE), and disk-facing, may also be applied to sides, edges and portions of other components of HDD 101 described herein, in particular, components of the particle-capturing device 192, and the particle-capturing system 190.

With further reference to FIGS. 1 and 2, in accordance with embodiments of the present invention, HDD 101 further includes HAA 114 shown in FIG. 2. HAA 114 includes an arm 132 attached to HGA 110, a carriage 134, a coil-support arm 136, and a voice coil 140 affixed to the carriage 134 by means of the coil-support arm 136. HDD 101 also includes a voice-coil motor (VCM). The VCM includes a stator 144 including a voice-coil magnet (not shown), and an armature, which may be thought of as also including the voice coil 140 and coil-support arm 136 in common with HAA 114. The armature of the VCM is attached to the carriage 134 and is configured to move the arm 132 and HGA 110 to access portions of the magnetic-recording disk 120-2, as the carriage 134 is mounted on a pivot-shaft 148 with an interposed pivot-bearing assembly 152. Electrical signals, for example, current to the voice coil 140 of the VCM, write signals to and read signals from the magnetic-recording head 110a, are provided by a flexible cable (not shown). An arm-electronics (AE) module 160 is attached to the carriage 134 as shown. Interconnection between the flexible cable and the magnetic-recording head 110a is provided by the AE module 160, which may have an on-board pre-amplifier for the read signal, as well as other read-channel and write-channel electronic components. The flexible cable is coupled to an electrical-connector block (not shown), which provides electrical communication through electrical feedthroughs (not shown) provided by the disk-enclosure base 168. The disk-enclosure base 168, also referred to as a casting, depending upon whether the disk-enclosure base 168 is cast, in conjunction with an HDD cover (not shown) provides a sealed, protective disk enclosure for the information storage components of HDD 101.

With further reference to FIG. 1, in accordance with embodiments of the present invention, other electronic components (not shown), including a disk controller and servo electronics including a digital-signal processor (DSP), provide electrical signals to the SPM, the voice coil 140 of the VCM and the magnetic-recording head 110a of HGA 110. The electrical signal provided to the SPM enables the SPM to spin providing a torque to the spindle 126 which is in turn transmitted to the magnetic-recording disk 120-2 that is affixed to the spindle 126 by the disk clamp 128; as a result, the magnetic-recording disk 120-2 spins in the direction 172. The spinning magnetic-recording disk 120-2 creates an airflow including an air-stream, which consequently also flows in the direction 172, and a cushion of air that acts as an air bearing on which an air-bearing surface (ABS) of the slider 110b rides so that the slider 110b flies in proximity with the recording surface of the magnetic-recording disk 120-2. In normal operation, the slider 110b flies in proximity with the recording surface of the magnetic-recording disk 120-2 without making contact with a thin magnetic-recording medium of the magnetic-recording disk 120-2 in which information is recorded. However, particles carried in the air-stream can scatter throughout the interior of the disk enclosure. Moreover, in the absence of embodiments of the present invention for capturing particles, such particles can become a source of instability in the flight of the slider 110b, can cause head crashes between the magnetic-recording head 110a and the magnetic-recording disk 120-2, and can damage the magnetic-recording disk 120-2 by settling on the recording surface of the magnetic-recording disk 120-2, or by intruding into the gap between the magnetic-recording disk 120-2 and the slider 110b.

With further reference to FIGS. 1 and 2, the electrical signal provided to the voice coil 140 of the VCM enables the magnetic-recording head 110a of HGA 110 to access a track 176 on which information is recorded. Thus, the armature of the VCM swings through an arc 180 which enables HGA 110 attached to the armature by the carriage 134 and arm 132 to access various tracks on the magnetic-recording disk 120-2. Information is stored on the magnetic-recording disk 120-2 in a plurality of concentric tracks (not shown) arranged in sectors (not shown) on the magnetic-recording disk 120-2. Correspondingly, each track is composed of a plurality of sectored track portions. Each sectored track portion is composed of recorded data and a header containing a servo-burst-signal pattern, for example, an ABCD-servo-burst-signal pattern, information that identifies the track 176, and error correction code information. In accessing the track 176, the read element of the magnetic-recording head 110a of HGA 110 reads the servo-burst-signal pattern which provides a position-error-signal (PES) to the servo electronics, which controls the electrical signal provided to the voice coil 140 of the VCM, enabling the magnetic-recording head 110a to follow the track 176. In normal operation, upon finding the track 176 and identifying a particular sectored track portion, the magnetic-recording head 110a either reads data from the track 176, or writes data to, the track 176 depending on instructions received by the disk controller from an external agent, for example, a microprocessor of a computer system.

However, in the absence of embodiments of the present invention for capturing particles, particles carried by the air-streams in the disk enclosure of HDD 101 may affect the purity of a particle-controlled space and affect the reliable operation of components in the space within the disk enclosure of HDD 101. For example, a signature of impact events with the slider 110b produced by particles carried by an air-stream within the disk-enclosure of HDD 101 is increased non-repeatable runout (NRRO) when accessing the track 176 through the servo-feedback mechanism that controls the VCM. NRRO is an error that results in attempting to position the magnetic-recording head 110a over a sought-after track 176 during a seek operation controlled by the servo electronics. NRRO is measured by a large PES encountered during the seek operation, and indicates that the magnetic-recording head 110a is not properly centered over the sought-after track 176 for reading and writing operations, which produces a soft error.

Embodiments of the present invention encompass within their scope a HDD 101 that includes a particle-capturing device 192. The particle-capturing device 192 is configured to remove particles from a plurality of air-streams carrying particles and flowing within the disk enclosure of HDD 101. In HDD 101, the plurality of air-streams may be produced by the rotation of the spinning magnetic-recording disk 120-2 and includes a rotational air-flow in the direction 172 around the spindle 126. An air-stream of the plurality of air-streams may also include a flow of particles that includes adventitious particulate debris within the disk enclosure of HDD 101. The particles pose a potential challenge to stable flight of the slider 110b and may cause the above-described errors in reading data from, and writing data to, the magnetic-recording disk 120-2. Therefore, embodiments of the present invention provide a particle-controlled space within the disk enclosure of HDD 101.

In accordance with embodiments of the present invention, a first example of the particle capturing device 192 is shown in FIG. 1. In accordance with embodiments of the present invention, HDD 101 may include the particle-capturing device 192 that includes a particle-capturing filter 192a and a filter holder 192b that holds the filter 192a. The filter 192a may be an electret filter composed of an electrostatic fiber material, or alternatively, may be a filter composed of static-free resin material or fiber material. The filter 192a has a front side and a back side. The front side of the filter 192a faces towards the ID of the magnetic-recording disk 120-2 towards a circumferential portion of the magnetic-recording disk 120-2 in HDD 101. The back side of the filter 192a faces in a direction opposite to that of the front side, which is towards an armature cavity provided in the VCM, in which the armature moves between stationary magnets of the stator 144 of the VCM. Thus, the plurality of air-streams, which the particle-capturing device 192 is configured to remove particles from, includes, by way of example without limitation thereto, at least: a first in-bound air-stream 196a-1 flowing in-bound through a first portion 192a-1 of the filter 192a from the front side of the filter 192a to the back side of the filter 192a; and, a second out-bound air-stream 196b flowing out-bound through a second portion 192a-2 of the filter 192a from the back side out through the front side of the filter 192a. Moreover, the filter holder 192b has, by way of example without limitation thereto, at least: a first opening 192b-1 that is configured to allow the first in-bound air-stream 196a-1 to flow in-bound through the first portion 192a-1 of the filter 192a, which is disposed in the first opening 192b-1, from the front side out through the back side of the filter 192a; and, a second opening 192b-2 that is configured to allow the out-bound air-stream 196b to flow out-bound through the second portion 192a-2 of the filter 192a, which is disposed in the second opening 192b-2, from the back side out through the front side of the filter 192a. In addition, the first opening 192b-1 of the filter holder 192b is configured to allow the first in-bound air-stream 196a-1 to flow in-bound towards the VCM from over the recording surface of the magnetic-recording disk 120-2 through the first portion 192a-1 of the filter 192a disposed in the first opening 192b-1; and, the second opening 192b-2 of the filter holder 192b is configured to allow the out-bound air-stream 196b to flow out-bound from the VCM towards the magnetic-recording disk 120-2 through the second portion 192a-2 of the filter 192a disposed in the second opening 192b-2. Thus, in accordance with embodiments of the present invention, the particle-capturing device 192 is configured to remove particles from a plurality of air-streams flowing within the disk enclosure of HDD 101.

With further reference to FIG. 1, in accordance with embodiments of the present invention, the particle-capturing device 192 may also include at least a first spoiler 192c-1, without limitation thereto, as the particle-capturing device 192 may include more than one spoiler. The first spoiler 192c-1 is disposed between the first opening 192b-1 and the second opening 192b-2 at the front side of the filter 192a and is configured to direct the first in-bound air-stream 196a-1 through the first opening 192b-1. The first spoiler 192c-1 is configured to produce a first high-pressure region 198a-1 adjacent to the first opening 192b-1 at the front side of the filter 192a. In one embodiment of the present invention, the first spoiler 192c-1 may be configured to produce a low-pressure region 198b adjacent to the second opening 192b-2 at the front side of the filter 192a. Thus, the first spoiler 192c-1 may also be configured to produce the out-bound air-stream 196b through the second opening 192b-2.

With further reference to FIG. 1, in accordance with embodiments of the present invention, HDD 101 may also include an air-flow damper plate 194 disposed in proximity to the recording surface of the magnetic-recording disk 120-2, such that a TE end of the damper plate 194 is disposed in proximity to the first opening 192b-1 of the filter holder 192b.

For HDD 101, the combination of the particle-capturing device 192 and the air-flow damper plate 194 constitutes a particle-capturing system 190 that is also configured to remove particles from the plurality of air-streams flowing within the disk enclosure of HDD 101. As described herein, embodiments of the present invention described for the particle capturing device 192 may be incorporated within the environment of the particle-capturing system 190.

With further reference to FIG. 1, in accordance with embodiments of the present invention, the air-flow damper plate 194 makes the air flowing in proximity with the recording surface of the magnetic-recording disk 120-2 more uniform and reduces the turbulence that buffets the magnetic-recording head 110a; the air-flow damper plate 194 also damps air-flow in proximity to the magnetic-recording disk 120-2 to suppress disk flutter. As shown in FIG. 1, the damper plate 194 has a crescent shape as viewed down along the axis of the spindle 126 and subtends a circular arc of about 270°. In one embodiment of the present invention, the damper plate 194 may have a blade shape in cross-section (not shown). Moreover, the damper plate 194 may be made to have a relatively large surface area, which is a surface area equal to a substantial fraction of the recording surface area of the magnetic-recording disk 120-2, such that the damper plate 194 may subtend an angle greater than, or lesser than, 270° and have a radial width that extends from the outer circumference at the OD of the magnetic-recording disk 120-2 towards the inner circumference at the ID of the magnetic-recording disk 120-2. In accordance with embodiments of the present invention, the particle-capturing system 190 including the damper plate 194 having a surface area that is a substantial fraction of the recording surface area of the magnetic-recording disk 120-2 produces greater air-drag, and consequently, greater power consumption by HDD 101. Thus, the shape and size of the damper plate 194 may be traded off against air-drag and power consumption, depending on the HDD design specifications.

With further reference to FIG. 1, in accordance with embodiments of the present invention, the first spoiler 192c-1 may have a beam shape and is coupled to a first support 192b-4, in the manner of a cantilevered wing coupled to first support 192b-4. The first support 192b-4 of the first spoiler 192c-1 is part of filter holder 192b, which holds the filter 192a outside the OD in the radial direction of the magnetic-recording disks, of which magnetic-recording disk 120-2 is an example. The filter 192a is placed further downstream than the damper plate 194 and at a position extending upstream from and downstream from the first spoiler 192c-1. The upstream and downstream portions of the filter holder 192b have respective openings 192b-1 and 192b-2. The air-stream generated in the direction 172 of disk rotation by the spinning of the magnetic-recording disks, of which magnetic-recording disk 120-2 is an example, collides with the first spoiler 192c-1 and raises the pressure in the first high-pressure region 198a-1 upstream from the LE of the first spoiler 192c-1. As for the pressures on either side of the filter 192a, the first high-pressure region 198a-1 on the side of the filter 192a facing the circumference portion of the magnetic-recording disk 120-2, namely the front side of the filter 192a, will have a higher pressure than a corresponding region on the side of the filter 192a facing the armature cavity of the VCM, namely the back side of the filter 192a. Consequently, air flows from the first high-pressure region 198a-1 through the first opening 192b-1, which is located upstream from the first spoiler 192c-1, and through the first portion 192a-1 of the filter 192a to the back side of the filter 192a as indicated by arrow associated with the first in-bound air-stream 196a-1 in FIG. 1. In addition, low-pressure region 198b has a decrease in pressure because this region is positioned downstream of the first spoiler 192c-1. Consequently, as for the pressures on either side of filter 192a in proximity to the downstream low-pressure region 198b, the pressure in proximity to the front side of the filter 192a, namely at the low-pressure region 198b, becomes lower than a pressure in a corresponding region in proximity to the back side of the filter 192a, and air flows from the armature cavity of the VCM through second opening 192b-2, which is located downstream from the first spoiler 192c-1, and through the second portion 192a-2 of the filter 192a from the back side of the filter 192a as indicated by arrow associated with the out-bound air-stream 196b in FIG. 1. Thus, in accordance with embodiments of the present invention, particles generated in the armature cavity of the VCM are collected by the filter 192a without passing over the magnetic-recording disks, of which magnetic-recording disk 120-2 is an example. Thus, according to this embodiment, in addition to the particles generated in the disk chamber of the disk enclosure of HDD 101, the particles generated in the armature cavity of the VCM can be collected by the filter 192a. Moreover, in accordance with embodiments of the present invention, particle-capturing device 192 may be constructed with a single filter; and, therefore, manufacturing costs can be kept low compared to when two separate filters are used in different parts of a disk enclosure of an HDD, one filter to capture particles from air-streams coming from the magnetic-recording disks, and another filter to capture particles from air-streams emanating from the VCM.

With further reference to FIG. 1, in accordance with embodiments of the present invention, when a magnetic-recording head 110a is positioned in the center, or the inner periphery, of the magnetic-recording disk 120-2, which occurs when the HAA 114 is rotated in towards the ID about the pivot-shaft 148, and air-streams caused by the HAA 114 are prevented, the pressures of first high-pressure region 198a-1 and low-pressure region 198b are increased by collisions of the air-streams circulating over the magnetic-recording disk 120-2 with the HAA 114. To reduce the pressure difference between the front side and the back side of the filter 192a at the second opening 192b-2, the out-bound air-stream 196b passing through second opening 192b-2 decreases. In addition, the pressure difference between the front side and the back side the filter 192a at first opening 192b-1 increases, and the first in-bound air-stream 196a-1 passing through the first opening 192b-1 increases. In light of these conditions, the magnitude of the effect of the position of the HAA 114 on the total filter air flow depends on the position of the filter 192a, the size and shape of the HAA 114, and the size and shape of the first spoiler 192c-1. However, compared to having only the second opening 192b-2, having two openings, similar to the first and second openings 192b-1 and 192b-2 of the first example of the particle-capturing device 192, diminishes the effect of the position of the HAA 114.

Consequently, for example, when the HAA 114 is rotated in to the ID of the magnetic-recording disk 120-2, an increase in the pressure in low-pressure region 198b and air-streams flowing in the opposite direction to the direction of the out-bound air-stream 196b as shown in FIG. 1 are possible depending on the size and shape of the HAA 114, and the shape and size of the first spoiler 192c-1, as well as other factors. By increasing the flow of the out-bound air-stream 196b passing through second opening 192b-2, as for the first example of the particle-capturing device 192 show in FIG. 1, particles generated on the magnetic-recording disk 120-2 side of the filter 192a can be collected by the filter 192a.

The flow of the out-bound air-stream 196b is from the back side to the front side of the filter 192a, when the HAA 114 is at the outer periphery, not because the HAA 114 is positioned by rotation inwards towards the ID of the magnetic-recording disk 120-2, as usually occurs under normal operating conditions. As described above, particles can be collected through the second opening 192b-2 and the filter 192a from the back side of the filter 192a facing the armature cavity of the VCM. Thus, in accordance with embodiments of the present invention, as for the first example of the particle-capturing device 192 show in FIG. 1, a particle-capturing device 192 is provided which can collect both particles generated on the magnetic-recording-disk side of the filter 192a and particles generated on the VCM side of the filter 192a that exhibits efficient particle-capturing performance independent of the arm position.

As shown in FIG. 1, the first spoiler 192c-1 appears as a separate component from the damper plate 194. However, in accordance with other embodiments of the present invention, the damper plate 194 and the first spoiler 192c-1 may be formed as a single unitary component, for example, as produced in an injection molding process. In addition, as shown in FIG. 1, the first spoiler 192c-1 has a beam shape. However, in accordance with alternative embodiments of the present invention, the first spoiler 192c-1 may be fan shaped, or blade shaped, similar to an air-foil. In addition, embodiments of the present invention are not limited to the respective widths shown in FIG. 1 for the damper plate 194 and the first spoiler 192c-1 in the radial direction of the magnetic-recording disk 120-2. In addition, for embodiments of the present invention, the rotational speed of the magnetic-recording disk 120-2 may lie in the range from 2400 revolutions per minute (rpm) up to 15,000 rpm; but, lower or higher values may also be used.

Figure 3:
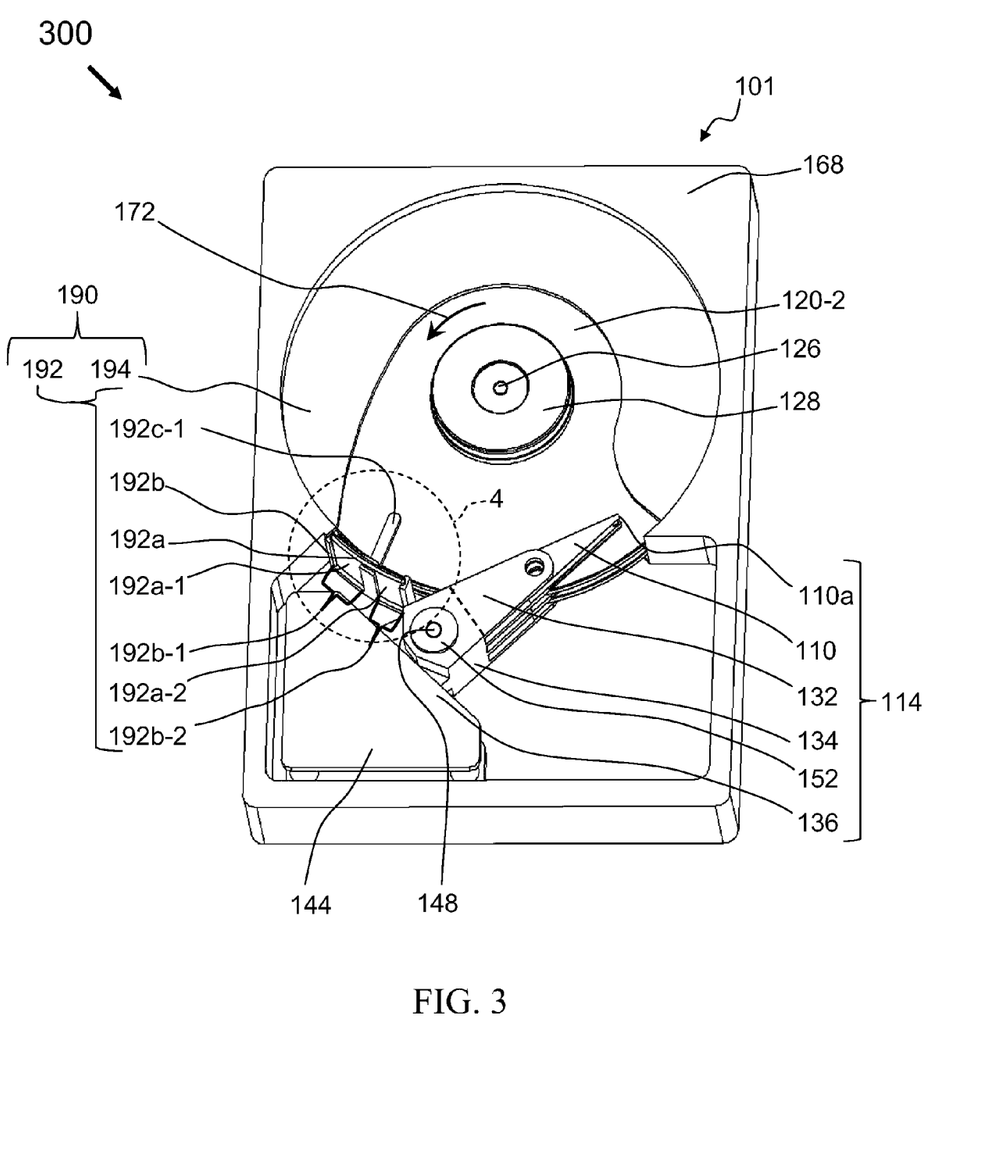
FIG. 3 is a perspective view showing the arrangement of components within the example environment of the HDD of FIG. 1 that includes the first example of the particle-capturing device, and the particle-capturing system including the particle-capturing device, in accordance with embodiments of the present invention.

With reference now to FIG. 3, in accordance with embodiments of the present invention, a perspective view 300 is shown of HDD 101. FIG. 3 further illustrates the arrangement of components within the example environment of HDD 101, previously described in the discussion of FIG. 1. In FIG. 3, the top magnetic-recording disk has been removed to illustrate the configuration for embodiments of the present invention in which spoilers, similar to the first spoiler 192c-1, and damper plates, similar to damper plate 194, are disposed only between the magnetic-recording disks, of which disk 120-2 is an example. In the case of an HDD having multiple disks, or platters as disks are sometimes referred to in the art, the carriage 134 is called an "E-block," or comb, as shown in FIG. 3, because the carriage is arranged to carry a ganged array of arms that gives the carriage 134 the appearance of a comb. Thus, the E-block may be provided with multiple HAAs; and, the recording surface of each magnetic-recording disk may be provided with a dedicated HGA. Consequently, in accordance with embodiments of the present invention, multiple components providing similar function may be provided in conjunction with these multiple magnetic-recording disks, such that the particle-capturing device 192 includes these multiple components. For example, in the spaces between magnetic-recording disks, multiple spoilers attached to the particle-capturing device 192, similar to the first spoiler 192c-1, as well as a second spoiler 192c-2 subsequently described (see FIGS. 5-10), without limitation thereto, may be provided. Similarly, the particle-capturing system 190 may include multiple damper plates, similar to damper plate 194, disposed in the spaces between magnetic-recording disks.

Moreover, with further reference to FIG. 3, embodiments of the present invention also include configurations in which spoilers, similar to the first spoiler 192c-1, as well as a second spoiler 192c-2, and damper plates, similar to damper plate 194, are disposed only between the magnetic-recording disks, of which disk 120-2 is an example. The components of the particle-capturing device 192 are configured such that the first portion 192a-1 of the filter 192a is configured to remove particulate debris from the first in-bound air-stream 196a-1 in-bound from over a recording surface of the magnetic-recording disk 120-2, and/or disks, and the second portion 192a-2 of the filter 192a is configured to remove particulate debris from the out-bound air-stream 196b out-bound from the VCM. As shown in FIG. 3, the HDD 101 is configured for: three magnetic-recording disks, the top most one of which has been removed; and, an E-block attached to four arms with six HGAs, with two HGAs attached on either side of the two middle arms, and one HGA attached to each of the top and bottom arms. However, embodiments of the present invention are not limited by the number of magnetic-recording disks, and associated components such as arms and HGAs, in the HDD; and, any number of magnetic-recording disks, and associated components such as arms and HGAs, within design limits, may be used. Moreover, in accordance with other embodiments of the present invention, the damper plate and spoilers are not limited to being positioned just between the magnetic-recording disks; and, thus, damper plates and spoilers may be positioned between the top magnetic-recording disk and the disk-enclosure cover, and/or between the bottom magnetic-recording disk, which is the magnetic-recording disk furthest from the disk-enclosure cover (not shown), and the disk-enclosure base 168, respectively.

Figure 4:
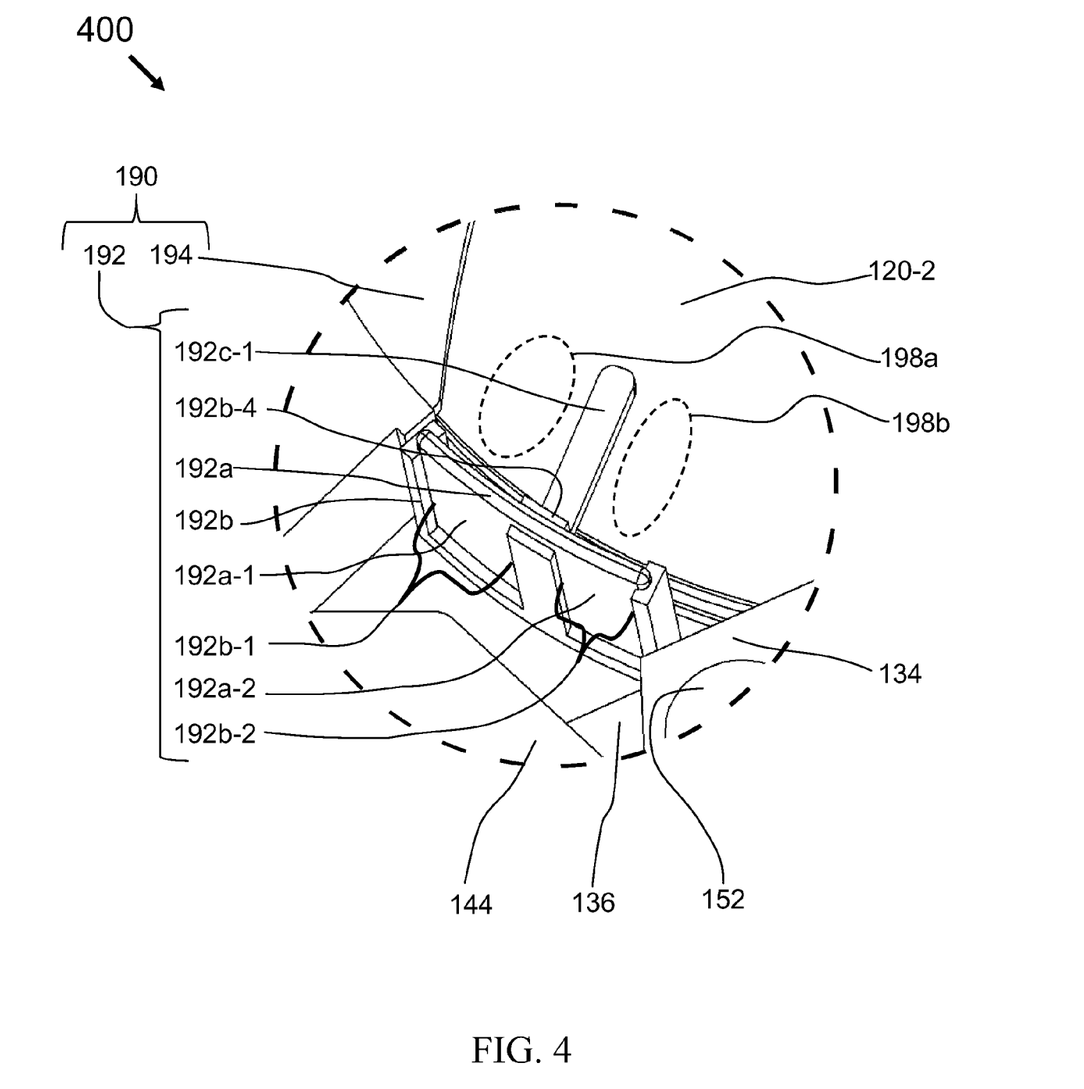
FIG. 4 is an enlarged perspective view showing details within circle 4 of FIG. 3 of the first example of the particle-capturing device, and the particle-capturing system including the particle-capturing device, in accordance with embodiments of the present invention.

With reference now to FIG. 4, in accordance with other embodiments of the present invention, an enlarged perspective view 400 shows details within circle 4 of FIG. 3 of the first example of the particle-capturing device 192. As shown in FIG. 4, the first example of the particle-capturing device 192 includes at least the first spoiler 192c-1, the filter 192a, and the filter holder 192b. Similar to the first example of the particle-capturing device 192 of FIGS. 1 and 3 described above, the filter holder 192b shown in FIG. 4 has a first opening 192b-1, and a second opening 192b-2. The components of the first example of the particle-capturing device 192 shown in FIG. 4 provide the same functionality of the same components previously described in FIGS. 1 and 3. In addition to components of the first example of the particle-capturing device 192 previously described in the discussion of FIGS. 1 and 3, the first example of the particle-capturing device 192, as shown in detail in FIG. 4, may also include a first support 192b-4 disposed at a downstream side of the first opening 192b-1. The first support 192b-4 may define the downstream side of the first opening 192b-1. In addition, the first support 192b-4 may be disposed between the first opening 192b-1 and the second opening 192b-2. Thus, the first support 192b-4 may also define an upstream side of the second opening 192b-2. As shown in FIG. 4, the first support 192b-4 is coupled to the first spoiler 192c-1.

Figure 5:
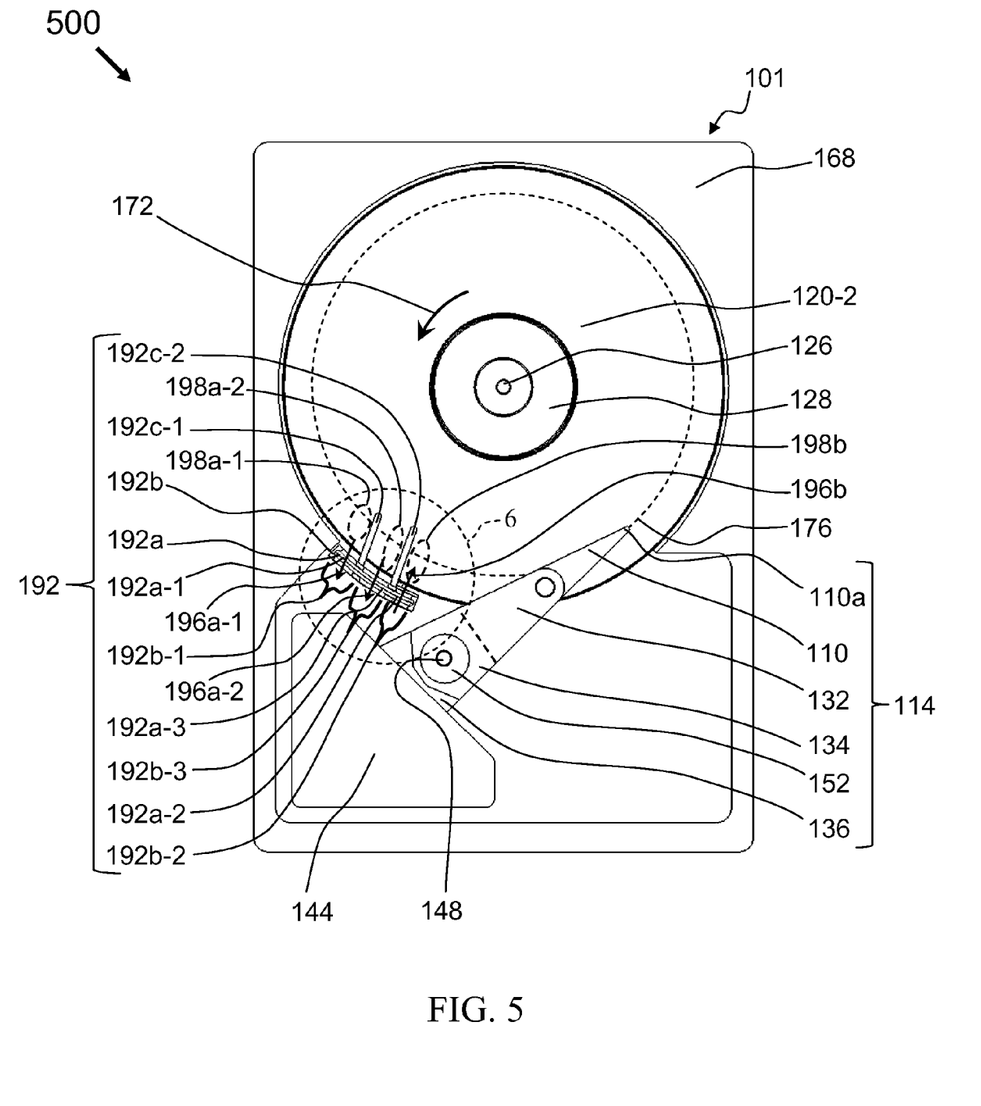
FIG. 5 is a plan view showing the arrangement of components within the example environment of the HDD that includes a second example of the particle-capturing device, in accordance with embodiments of the present invention.

With reference now to FIG. 5, in accordance with embodiments of the present invention, a plan view 500 is shown of the arrangement of components within the example environment of HDD 101 that includes a second example of the particle-capturing device 192. In addition to components of the first example of the particle-capturing device 192 previously described in the discussion of FIGS. 1 and 3, the filter holder 192b of the second example of the particle-capturing device 192 has a third opening 192b-3 configured to allow a second in-bound air-stream 196a-2, of the plurality of air-streams, to flow in-bound through a third portion 192a-3 of the filter 192a from the front side out through the back side of the filter 192a. The third portion 192a-3 of the filter 192a is disposed in the third opening 192b-3. Also, as shown in FIG. 5, the third opening 192b-3 is disposed between the first opening 192b-1 and the second opening 192b-2. As shown in FIG. 5, the second example of the particle-capturing device 192 also includes a second spoiler 192c-2. The second spoiler 192c-2 is disposed between the second opening 192b-2 and the third opening 192b-3 at the front side of the filter 192a. The second spoiler 192c-2 is configured to direct the second in-bound air-stream 196a-2 through the third opening 192b-3. The second spoiler 192c-2 is configured to produce a second high-pressure region 198a-2 adjacent to the third opening 192b-3 at the front side of the filter 192a and a low-pressure region 198b adjacent to the second opening 192b-2 at the front side of the filter 192a. Thus, the second spoiler 192c-2 is configured to produce the out-bound air-stream 196b through the second opening 192b-2. Thus, in accordance with embodiments of the present invention, the second example of the particle capturing device 192 includes the first spoiler 192c-1, the second spoiler 192c-2, and the filter holder 192b modified with the additional third opening 192b-3 and a second support 192b-5, which is next described.

Figure 6:
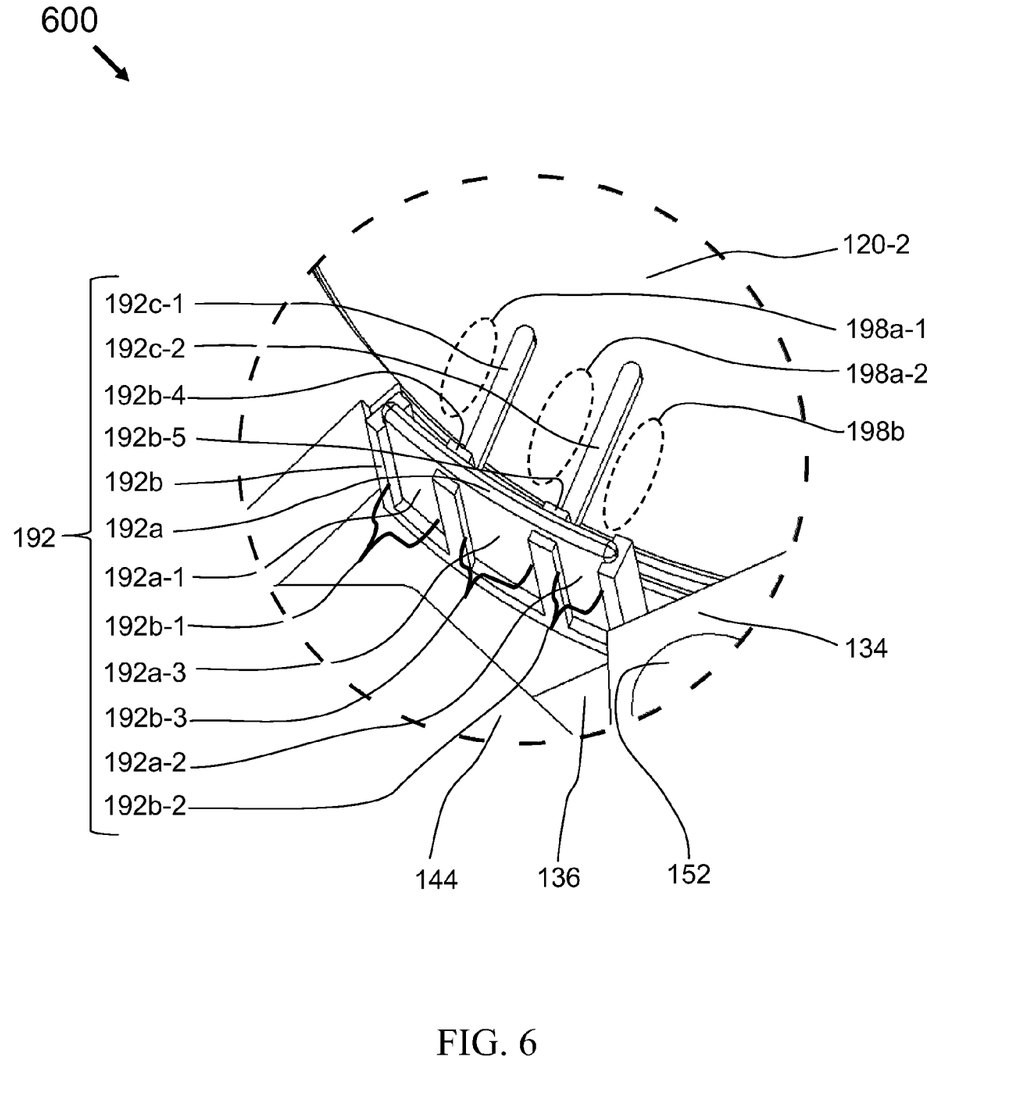
FIG. 6 is an enlarged perspective view showing details within circle 6 of FIG. 5 of the second example of the particle-capturing device, in accordance with embodiments of the present invention.

With reference now to FIG. 6, in accordance with embodiments of the present invention, an enlarged perspective view 600 shows details within circle 6 of FIG. 5 of the second example of the particle-capturing device 192. As shown in FIG. 6, the second example of the particle-capturing device 192 further includes a second support 192b-5 disposed between the third opening 192b-3 and the second opening 192b-2. The second support 192b-5 defines a downstream side of the third opening 192b-3 and an upstream side of the second opening 192b-2. The second support 192b-5 is coupled to the second spoiler 192c-2. Thus, in accordance with embodiments of the present invention, the second example of the particle capturing device 192 includes the first support 192b-4, and the second support 192b-5 for providing mechanical support to the first spoiler 192c-1, and the second spoiler 192c-2, respectively.

Thus, with further reference to FIGS. 5 and 6, in accordance with embodiments of the present invention, the filter holder 192b has a first opening 192b-1, a second opening 192b-2, and a third opening 192b-3. The filter 192a is placed at a position that extends from upstream of the first spoiler 192c-1 to downstream of the second spoiler 192c-2. Similar to the first example of the particle capturing device 192 described above in the discussion of FIGS. 1-4, the air-stream circulating above the magnetic-recording disk 120-2 collides with the first spoiler 192c-1 in the first high-pressure region 198a-1 positioned upstream from the first spoiler 192c-1, but also, in this case, collides with the second spoiler 192c-2 in the second high-pressure region 198a-2 positioned upstream from the second spoiler 192c-2, and the pressure increases in front of both the first and third openings 192b-1 and 192b-3. Similar to the first example of particle-capturing device 192 shown in FIGS. 1-4, the pressure is also decreased in the low-pressure region 198b in front of the second opening 192b-2; but, in this case, the low-pressure region 198b is positioned downstream from the second spoiler 192c-2. Thus, because the air-streams 196a-1, 196a-2 and 196b flow in the directions indicated by the arrows shown in FIG. 5, similar to the air-streams 196a-1 and 196b shown in FIG. 1, both particles generated in the space above the magnetic-recording disk 120-2 and particles generated in the armature cavity of the VCM can be collected by the filter 192a of the particle-capturing device 192.

Figure 7:
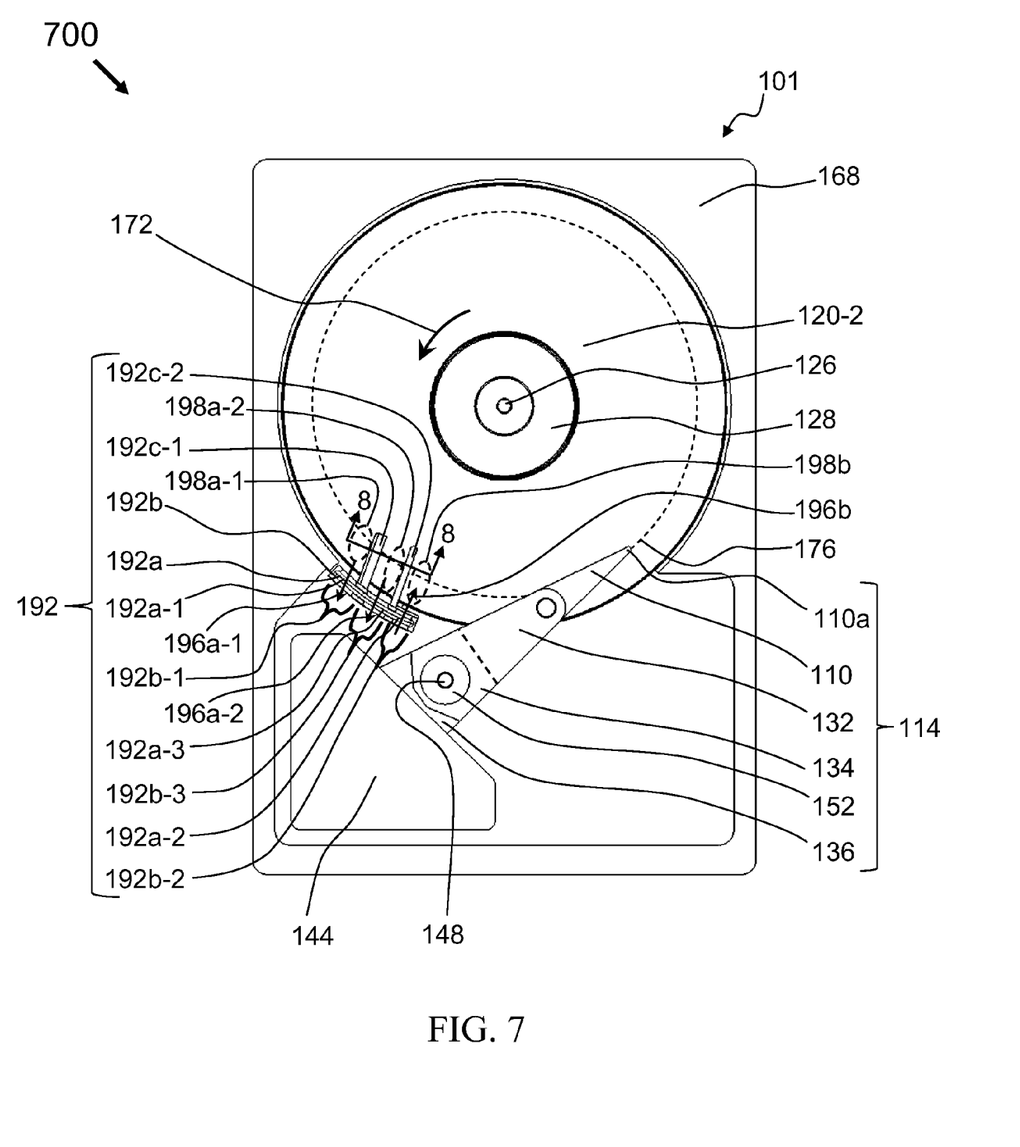
FIG. 7 is a plan view showing the arrangement of components within the example environment of the HDD that includes a third example of the particle-capturing device, in accordance with embodiments of the present invention.
Figure 8:
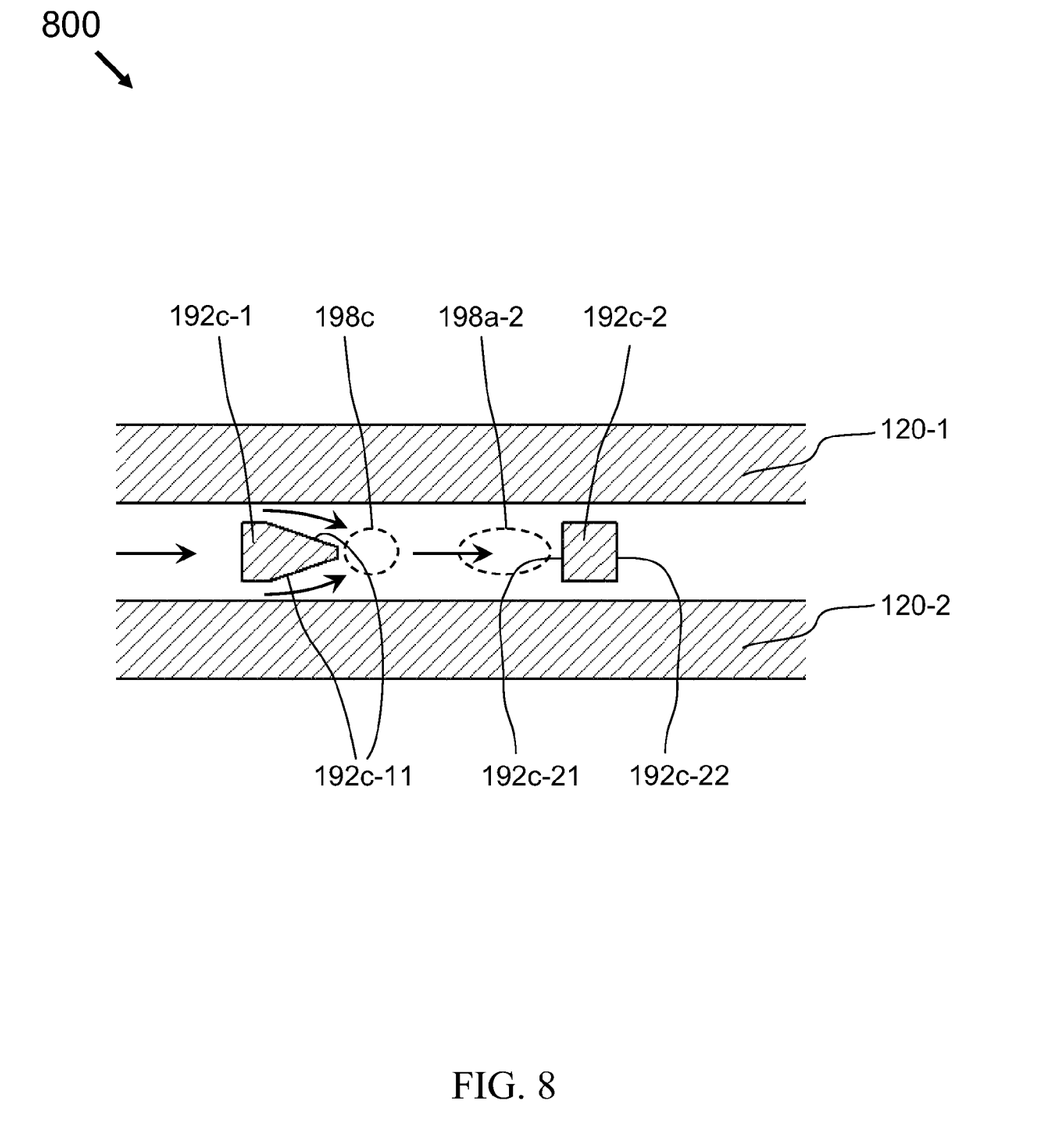
FIG. 8 is an enlarged cross-sectional elevation view showing details of a cross-section along line 8-8 of FIG. 7 of the third example of the particle-capturing device, in accordance with embodiments of the present invention.

With reference now to FIGS. 7 and 8, in accordance with embodiments of the present invention, a plan view 700 shows the arrangement of components within the example environment of HDD 101 that includes a third example of the particle-capturing device 192; and, an enlarged cross-sectional elevation view 800 shows details of a cross-section along line 8-8 of FIG. 7 of the third example of the particle-capturing device 192. As shown in FIGS. 7 and 8, the third example of the particle-capturing device 192 includes at least the first spoiler 192c-1, the second spoiler 192c-2, the filter 192a and the filter holder 192b. Similar to the second example of the particle-capturing device 192 of FIGS. 5 and 6 described above, the filter holder 192b has a first opening 192b-1, a second opening 192b-2, and a third opening 192b-3. The filter holder 192b also includes the first support 192b-4, and the second support 192b-5 for supporting the first spoiler 192c-1, the second spoiler 192c-2, respectively. These respective components of the third example of the particle-capturing device 192 provide similar functionality to the analogous components previously described.

With further reference to FIGS. 7 and 8, in accordance with embodiments of the present invention, the cross-sectional elevation view 800 along line 8-8 of FIG. 7 shows the vicinity of the first spoiler 192c-1 and the second spoiler 192c-2 between the top most magnetic-recording disk 120-1 and the magnetic-recording disk 120-2. In addition to components of the second example of the particle-capturing device 192 previously described in the discussion of FIGS. 5 and 6, the first spoiler 192c-1 of the third example of the particle-capturing device 192 further includes a tapered portion 192c-11; and, the second spoiler 192c-2 of the third example of the particle-capturing device 192 further includes a squared-off LE portion 192c-21 and a squared-off TE portion 192c-22. As shown in FIG. 8, a tapered portion 192c-11 of the first spoiler 192c-1 has a shape that thins the profile of first spoiler 192c-1 down in the direction of the air-stream flow along the direction of rotation of the magnetic-recording disks 120-1 and 120-2 between the top most magnetic-recording disk 120-1 and the magnetic-recording disk 120-2. Thus, in accordance with embodiments of the present invention, the first spoiler 192c-1 has a shape that tapers down towards a TE of the first spoiler 192c-1. In this kind of structure, the tapered portion 192c-11 suppresses the separation of air-streams, which are indicated by the curved arrows above and below the first spoiler 192c-1, in the downstream region 198c of the first spoiler 192c-1, and restricts a decrease in pressure in this downstream region 198c of the first spoiler 192c-1. As shown in FIG. 8, the second spoiler 192c-2 may also have a shape that is squared-off at a LE portion 192c-21 and squared-off at a TE portion 192c-22 of the second spoiler 192c-2. The pressures in the second high-pressure region 198a-2 that is located upstream from the second spoiler 192c-2 increases substantially, because of the collision of the air-stream coming off of the tapered portion 192c-11 of the first spoiler 192c-1 with the squared-off LE portion 192c-21 of the second spoiler 192c-2. As a result, the flow of the air-stream 196a-2 flowing through the third opening 192b-3 into the filter 192a increases considerably. Thus, in accordance with embodiments of the present invention, particle-capturing performance becomes more efficient, when compared to particle-capturing performance in the absence of either the first spoiler 192c-1 modified with tapered portion 192c-11, or the second spoiler 192c-2 modified with the squared-off LE portion 192c-21.

Figure 9:
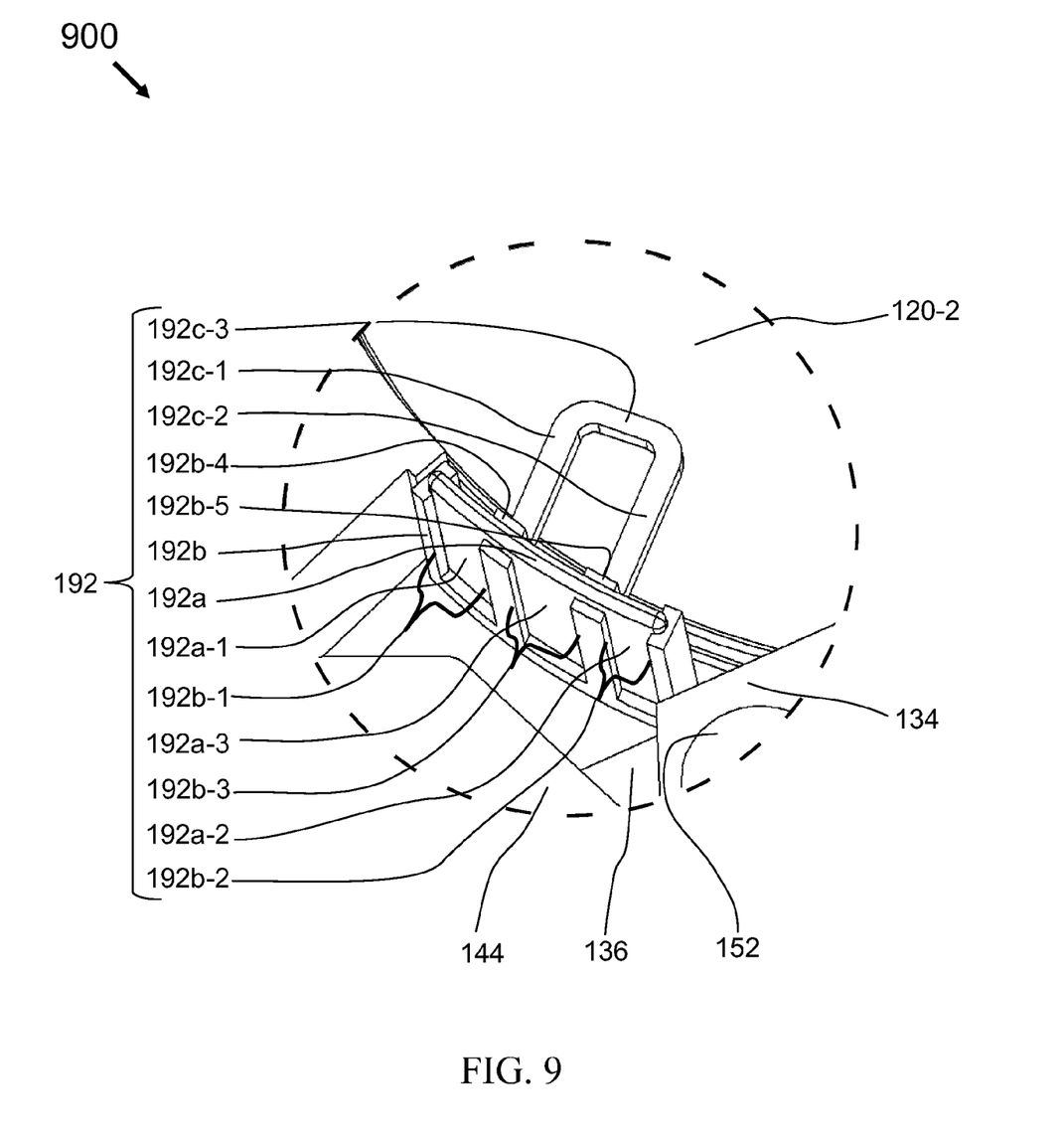
FIG. 9 is an enlarged perspective view showing details of a fourth example of the particle-capturing device, in accordance with embodiments of the present invention.

With reference now to FIG. 9, in accordance with embodiments of the present invention, an enlarged perspective view 900 shows details of a fourth example of the particle-capturing device 192. As shown in FIG. 9, the fourth example of the particle-capturing device 192 includes at least the first spoiler 192c-1, the second spoiler 192c-2, the filter 192a and the filter holder 192b. Similar to previously described examples of the particle-capturing device 192 of FIGS. 5-8, the filter holder 192b has a first opening 192b-1, a second opening 192b-2, and a third opening 192b-3. The filter holder 192b also includes the first support 192b-4, and the second support 192b-5 for supporting the first spoiler 192c-1, the second spoiler 192c-2, respectively. These respective components of the fourth example of the particle-capturing device 192 provide similar functionality to the analogous components previously described.

With further reference to FIG. 9, in accordance with embodiments of the present invention, the fourth example of the particle-capturing device 192 further includes an inter-spoiler bridge 192c-3. The first spoiler 192c-1 is disposed between the first opening 192b-1 and the third opening 192b-3 at the front side of the filter 192a. The first spoiler 192c-1 is configured to direct the first in-bound air-stream 196a-1 through the first opening 192b-1. The second spoiler 192c-2 is disposed between the second opening 192b-2 and the third opening 192b-3 at the front side of the filter 192a. The second spoiler 192c-2 is configured to direct the second in-bound air-stream 196a-2 through the third opening 192b-3. The inter-spoiler bridge 192c-3 is disposed at, and coupled to, front ends of the first spoiler 192c-1 and the second spoiler 192c-2, which are the ends of the first spoiler 192c-1 and the second spoiler 192c-2 that lie more proximately to the ID of the magnetic-recording disk 120-2. The inter-spoiler bridge 192c-3 is configured to stiffen the front ends of the first spoiler 192c-1 and the second spoiler 192c-2. As a result, the strength of the particle-capturing device 192 can be increased; and, resistance to shock of HDD 101 is correspondingly increased. Moreover, the inter-spoiler bridge 192c-3 is configured to reduce air-stream induced vibrations of the first spoiler 192c-1 and the second spoiler 192c-2 at the front ends of the first spoiler 192c-1 and the second spoiler 192c-2. Consequently, the inter-spoiler bridge 192c-3 is configured to reduce air-stream turbulence at the front ends of the first spoiler 192c-1 and the second spoiler 192c-2. As a result, the inter-spoiler bridge 192c-3 is configured to reduce air-stream induced disk flutter of the magnetic-recording disk 120-2. In the absence of embodiments of the present invention, greater amounts of air-stream induced disk flutter of the magnetic-recording disk 120-2 might otherwise be caused by greater amounts of air-stream turbulence at the front ends of the first spoiler 192c-1 and the second spoiler 192c-2, when the inter-spoiler bridge 192c-3 is absent.

Figure 10:
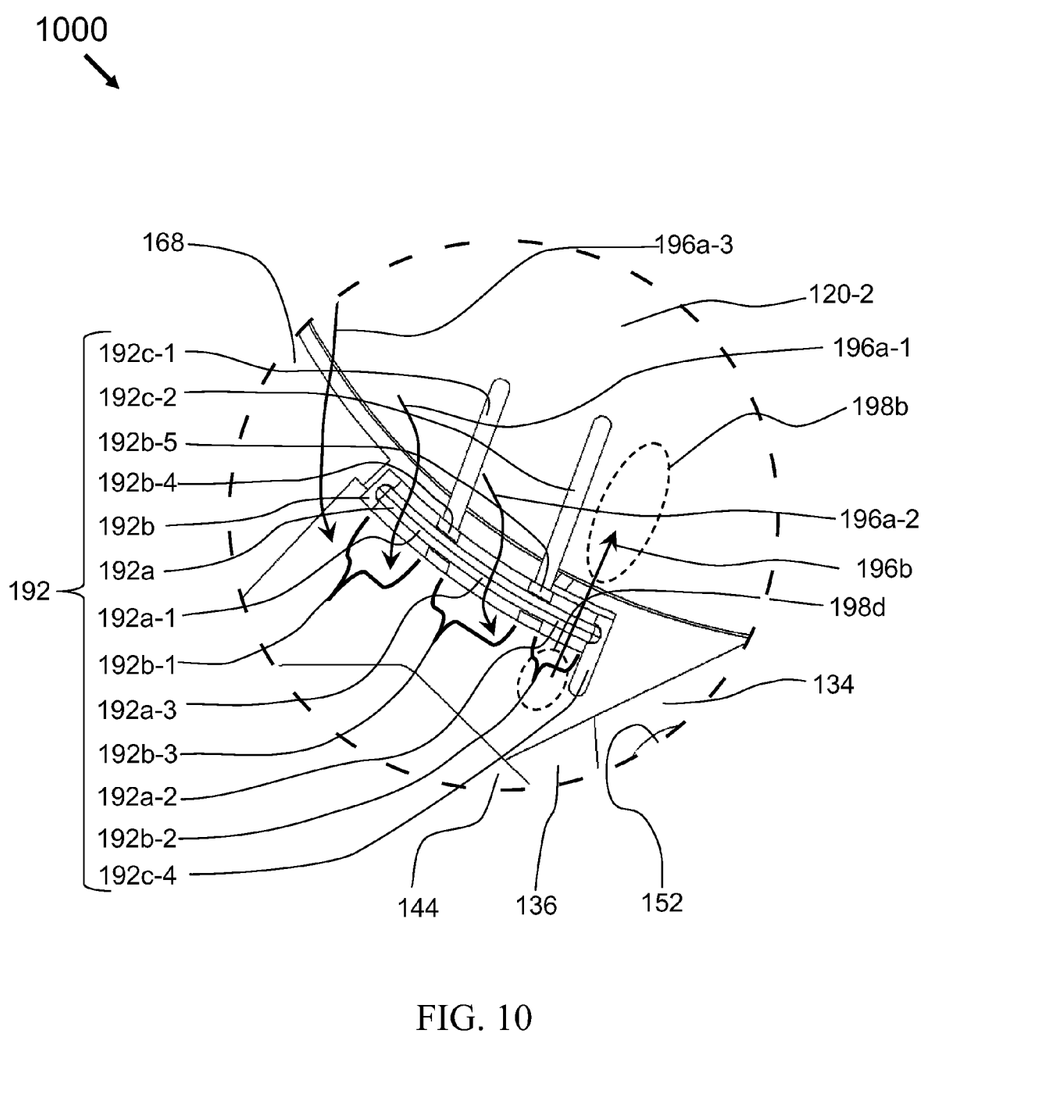
FIG. 10 is an enlarged plan view showing details of a fifth example of the particle-capturing device, in accordance with embodiments of the present invention.

With reference now to FIG. 10, in accordance with embodiments of the present invention, an enlarged plan view 1000 shows details of a fifth example of the particle-capturing device 192. As shown in FIG. 10, the fifth example of the particle-capturing device 192 includes at least the first spoiler 192c-1, the second spoiler 192c-2, the filter 192a and the filter holder 192b. Similar to previously described examples of the particle-capturing device 192 of FIGS. 5-9, the filter holder 192b has a first opening 192b-1, a second opening 192b-2, and a third opening 192b-3. The filter holder 192b also includes the first support 192b-4, and the second support 192b-5 for supporting the first spoiler 192c-1, the second spoiler 192c-2, respectively. These respective components of the fifth example of the particle-capturing device 192 provide similar functionality to the analogous components previously described.

With further reference to FIG. 10, in accordance with embodiments of the present invention, the fifth example of the particle-capturing device 192 further includes an out-bound air-stream flow diverter 192c-4 coupled to the filter holder 192b. The out-bound air-stream flow diverter 192c-4 is disposed at a downstream side of the second opening 192b-2 at the back side of the filter 192a. As shown in FIG. 10, the out-bound air-stream flow diverter 192c-4 extends outwards from the vicinity of the OD of the magnetic-recording disk 120-2 in a radial direction of the magnetic-recording disk 120-2, and from the back of the filter holder 192b. By providing the particle-capturing device 192 with the out-bound air-stream flow diverter 192c-4, a third in-bound air-stream 196a-3 flowing between the disk-enclosure base 168 and the disk-enclosure cover at the upstream part of the particle-capturing device 192, the first in-bound air-stream 196a-1 passing through the first opening 192b-1 and the first portion 192a-1 of the filter 192a, and the second in-bound air-stream 196a-2 passing through the third opening 192b-3 and the third portion 192a-3 of the filter 192a collide with the out-bound air-stream flow diverter 192c-4, when returning to the disk chamber of the disk enclosure of HDD 101. Therefore, the pressure increases considerably in the region 198d upstream from the out-bound air-stream flow diverter 192c-4. Consequently, because the pressure difference between region 198d upstream from the out-bound air-stream flow diverter 192c-4 and low-pressure region 198b increases, the out-bound air-stream 196b through the second opening 192b-2 and the second portion 192a-2 of the filter 192a increases. Thus, in accordance with embodiments of the present invention, the out-bound air-stream flow diverter 192c-4 is configured to direct the out-bound air-stream 196b through the second opening 192b-2. Moreover, in accordance with embodiments of the present invention, particle-capturing performance becomes more efficient, when compared to particle-capturing performance in the absence of the out-bound air-stream flow diverter 192c-4.

Embodiments of the present invention are useful in providing a means to capture particles, which otherwise might cause a head-disk interference (HDI) event that results in a hard error at the recording surface of the magnetic-recording disk 120-2. Embodiments of the present invention are directed to reducing both the hard errors associated with damage to the recording surface of the magnetic-recording disk 120-2, and the soft errors due to NRRO associated with particles carried by the plurality of air-streams in the disk enclosure of HDD 101, for example, in-bound air-streams 196a-1, 196a-2 and 196a-3, as well as out-bound air-stream 196b. Thus, the arrangement of the component parts of the particle-capturing device 192 in HDD 101 enables capture of particles from air-streams circulating over the recording surface of the magnetic-recording disk 120-2, for example, in-bound air-streams 196a-1, 196a-2 and 196a-3, and from air-streams emerging from the VCM, for example, out-bound air-stream 196b. Moreover, embodiments of the present invention enable the capture of particles from such air-streams independent of the location of HAA 114, even when HAA 114 is positioned in proximity to tracks at the ID of the magnetic-recording disk 120-2.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A particle-capturing device configured to remove particles from a plurality of air-streams flowing within a disk enclosure of a hard-disk drive, said particle-capturing device comprising:
   a particle-capturing filter, said filter having a front side and a back side;
   a filter holder holding said filter, said filter holder having a first opening configured to allow a first in-bound air-stream to flow in-bound through a first portion of said filter, disposed in said first opening, from said front side out through said back side of said filter, and having a second opening configured to allow an out-bound air-stream to flow out-bound through a second portion of said filter, disposed in said second opening, from said back side out through said front side of said filter, wherein said filter holder has a third opening configured to allow a second in-bound air-stream to flow in-bound through a third portion of said filter disposed in said third opening from said front side out through said back side of said filter, said third opening disposed between said first opening and said second opening; and
   a second spoiler disposed between said second opening and said third opening at said front side of said filter, said second spoiler configured to direct said second in-bound air-stream through said third opening.

2. The particle-capturing device of claim 1, further comprising:
   a first spoiler disposed between said first opening and said second opening at said front side of said filter, said first spoiler configured to direct said first in-bound air-stream through said first opening.

3. The particle-capturing device of claim 2, wherein said first spoiler is configured to produce said out-bound air-stream through said second opening.

4. The particle-capturing device of claim 2, wherein said first spoiler is configured to produce a first high-pressure region adjacent to said first opening at said front side of said filter and a low-pressure region adjacent to said second opening at said front side of said filter.

5. The particle-capturing device of claim 2, wherein said first spoiler has a shape that tapers down towards a trailing edge of said first spoiler.

6. The particle-capturing device of claim 1, wherein said filter holder further comprises a first support disposed at a downstream side of said first opening, said first support defining said downstream side of said first opening.

7. The particle-capturing device of claim 6, wherein said first support is coupled to a first spoiler.

8. The particle-capturing device of claim 1, wherein said second spoiler is configured to produce said out-bound air-stream through said second opening.

9. The particle-capturing device of claim 1, wherein said second spoiler is configured to produce a second high-pressure region adjacent to said third opening at said front side of said filter and a low-pressure region adjacent to said second opening at said front side of said filter.

10. The particle-capturing device of claim 1, wherein said second spoiler has a shape that is squared-off at a leading-edge portion and squared-off at a trailing-edge portion of said second spoiler.

11. The particle-capturing device of claim 1, wherein said filter holder further comprises a second support disposed between said third opening and said second opening, said second support defining a downstream side of said third opening and an upstream side of said second opening.

12. The particle-capturing device of claim 11, wherein said second support is coupled to a second spoiler.

13. The particle-capturing device of claim 1, further comprising:
   a first spoiler disposed between said first opening and said third opening at said front side of said filter, said first spoiler configured to direct said first in-bound air-stream through said first opening;
   a second spoiler disposed between said second opening and said third opening at said front side of said filter, said second spoiler configured to direct said second in-bound air-stream through said third opening; and
   an inter-spoiler bridge disposed at and coupled to front ends of said first spoiler and said second spoiler, said inter-spoiler bridge configured to stiffen said front ends of said first spoiler and said second spoiler.

14. The particle-capturing device of claim 1, further comprising:
   an out-bound air-stream flow diverter coupled to said filter holder and disposed at a downstream side of said second opening at said back side of said filter, said out-bound air-stream flow diverter configured to direct said out-bound air-stream through said second opening.

15. A hard-disk drive including a particle-capturing device configured to remove particles from a plurality of air-streams flowing within a disk enclosure of said hard-disk drive, said hard-disk drive comprising:
   a magnetic-recording disk;
   a head-arm assembly including a magnetic-recording head disposed at a distal end of said head-arm assembly, said magnetic-recording head disposed to write data to, and to read data from, said magnetic-recording disk;
   a voice-coil motor configured to move said head-arm assembly in accessing data on said magnetic-recording disk with said magnetic-recording head;
   a disk enclosure configured to provide a protected environment in which said magnetic-recording disk, said magnetic-recording head, and said voice-coil motor are disposed;
   a spindle motor mounted in a disk-enclosure base of said disk enclosure, said spindle motor coupled to a spindle to which said magnetic-recording disk is rotatably attached, and configured to rotate said magnetic-recording disk in accessing data on said magnetic-recording disk by said magnetic-recording head; and
   a particle-capturing device configured to remove particles from a plurality of air-streams flowing within said disk enclosure, said particle-capturing device comprising:
      a particle-capturing filter, said filter having a front side and a back side;
      a filter holder holding said filter, said filter holder having a first opening configured to allow a first in-bound air-stream to flow in-bound towards said voice-coil motor from over a recording surface of said magnetic-recording disk through a first portion of said filter disposed in said first opening, and having a second opening configured to allow an out-bound air-stream to flow out-bound from said voice-coil motor towards said magnetic-recording disk through a second portion of said filter disposed in said second opening, wherein said filter holder has a third opening configured to allow a second in-bound air-stream to flow in-bound towards said voice-coil motor from over said recording surface of said magnetic-recording disk through a third portion of said filter disposed in said third opening, said third opening disposed between said first opening and said second opening;

a first spoiler disposed downstream of said first opening and upstream of said second opening at said front side of said filter, and disposed in proximity to a recording surface of said magnetic-recording disk, said first spoiler configured to direct said first in-bound air-stream through said first opening; and a second spoiler disposed between said second opening and said third opening at said front side of said filter, and disposed in proximity to said recording surface of said magnetic-recording disk, said second spoiler configured to direct said second in-bound air-stream through said third opening, wherein the first spoiler is disposed between said first opening and said third opening at said front side of said filter.

16. The hard-disk drive of claim 15, further comprising:
an air-flow damper plate disposed in proximity to said recording surface of said magnetic-recording disk, a trailing-edge end of said damper plate disposed in proximity to said first opening.

17. The hard-disk drive of claim 15, wherein, independent of position of said head-arm assembly relative to said spindle, said first portion of said filter is configured to remove particulate debris from said first in-bound air-stream in-bound from over a recording surface of said magnetic-recording disk, and said second portion of said filter is configured to remove particulate debris from said out-bound air-stream out-bound from said voice-coil motor.

18. The hard-disk drive of claim 15, further comprising:
an inter-spoiler bridge disposed at and coupled to front ends of said first spoiler and said second spoiler, said inter-spoiler bridge configured to stiffen said front ends of said first spoiler and said second spoiler.

19. The hard-disk drive of claim 15, wherein said first spoiler has a shape that tapers down towards a trailing edge of said first spoiler; and
wherein the second spoiler has a shape that is squared-off at a leading-edge portion and squared-off at a trailing-edge portion of said second spoiler.

20. The hard-disk drive of claim 15, further comprising:
an out-bound air-stream flow diverter coupled to said filter holder and disposed at a downstream side of said second opening at said back side of said filter, said out-bound air-stream flow diverter configured to direct said out-bound air-stream through said second opening.

21. A particle-capturing system configured to remove particles from a plurality of air-streams flowing within a disk enclosure of a hard-disk drive, said particle-capturing system comprising:
a particle-capturing device, comprising:
a particle-capturing filter, said filter having a front side and a back side;
a filter holder holding said filter, said filter holder having a first opening configured to allow a first in-bound air-stream to flow in-bound towards a voice-coil motor from over a recording surface of a magnetic-recording disk through a first portion of said filter disposed in said first opening, and having a second opening configured to allow an out-bound air-stream to flow out-bound from said voice-coil motor towards said magnetic-recording disk through a second portion of said filter disposed in said second opening, wherein said filter holder has a third opening configured to allow a second in-bound air-stream to flow in-bound towards said voice-coil motor from over said recording surface of said magnetic-recording disk through a third portion of said filter disposed in said third opening, said third opening disposed between said first opening and said second opening;
a first spoiler disposed downstream of said first opening and upstream of said second opening at said front side of said filter, and disposed in proximity to a recording surface of said magnetic-recording disk, at least one spoiler configured to direct said first in-bound air-stream through said first opening;
a second spoiler disposed between said second opening and said third opening at said front side of said filter, and disposed in proximity to said recording surface of said magnetic-recording disk, said second spoiler configured to direct said second in-bound air-stream through said third opening, wherein the first spoiler is disposed between said first opening and said third opening at said front side of said filter; and
an air-flow damper plate disposed in proximity to said recording surface of said magnetic-recording disk, wherein a trailing-edge end of said damper plate is disposed in proximity to said first opening.

* * * * *